United States Patent [19]

Solc

[11] Patent Number: 4,609,608

[45] Date of Patent: * Sep. 2, 1986

[54] COLLOIDAL SIZE HYDROPHOBIC POLYMER PARTICULATE HAVING DISCRETE PARTICLES OF A METAL DISPERSED THEREIN

[75] Inventor: Jitka Solc, Midland, Mich.

[73] Assignee: The Dow Chemical Company, Midland, Mich.

[*] Notice: The portion of the term of this patent subsequent to Dec. 20, 2000 has been disclaimed.

[21] Appl. No.: 702,174

[22] Filed: Feb. 15, 1985

Related U.S. Application Data

[63] Continuation-in-part of Ser. No. 546,014, Oct. 27, 1983, which is a continuation-in-part of Ser. No. 216,695, Dec. 15, 1980, Pat. No. 4,421,660.

[51] Int. Cl.[4] .................................................. G03G 9/14
[52] U.S. Cl. ................................ 430/106.6; 252/62.54
[58] Field of Search .................. 252/62.54; 430/106.6; 106/308 M; 524/439

[56] References Cited

U.S. PATENT DOCUMENTS 4,421,660 12/1983 Solc .................................. 252/62.54

Primary Examiner—John L. Goodrow

[57] ABSTRACT

Colloidal size particles of a non-oxidized metal (e.g., iron or silver) are encapsulated in a hydrophobic polymer (e.g., a copolymer of styrene and butylacrylate) by a polymerization process wherein a water-immiscible monomer is dispersed in an aqueous colloidal dispersion of preformed metal particles and subjected to conditions of emulsion polymerization. The resulting encapsulated non-oxidized metal particles are usefully employed as electrically resistive barriers, toners, electroconductive additives and as pressure sensors.

13 Claims, No Drawings

COLLOIDAL SIZE HYDROPHOBIC POLYMER PARTICULATE HAVING DISCRETE PARTICLES OF A METAL DISPERSED THEREIN

CROSS-REFERENCE TO RELATED APPLICATIONS

This is a continuation-in-part of copending U.S. patent application Ser. No. 546,014, filed Oct. 27, 1983, which is a continuation-in-part of U.S. patent application Ser. No. 216,695, filed Dec. 15, 1980, now U.S. Pat. No. 4,421,660.

BACKGROUND OF THE INVENTION

This invention relates to colloidal size particulates containing particles of an inorganic material and to polymerization processes used to prepare such particulates.

Pigments, fillers, metal oxides and other inorganic particulates that tend to agglomerate are often coated with or encapsulated in hydrophobic polymers. These coated or encapsulated particles are often used in a wide variety of applications such as electroconductive additives to plastics, toners in electrophotographic applications, pigmented paints as well as many other applications.

Conventionally, such particulates are prepared by (1) treating the inorganic solid with acid, a combination of acid and base, alcohol or a polymer solution; (2) dispersing an addition polymerizable monomer in an aqueous dispersion of a treated inorganic solid and (3) subjecting the resulting dispersion to emulsion polymerization conditions. Examples of such methods are described in U.S. Pat. Nos. 4,048,136; 3,383,346; 3,935,340; 3,544,500 and 3,884,871. Unfortunately, these methods are deficient in that they often require expensive multi-step procedures, anchoring agents, functional additives, stabilizing agents and the like. Also, the polymeric particulates often must be employed as viscous pastes or dry powders. Furthermore, such aforementioned processes do not involve the preparation of metal particles which are encapsulated with hydrophobic polymers. In addition, such aforementioned processes introduce problems such as agglomeration of metal particles and oxidation of metal particles in numerous circumstances.

The in situ encapsulation of various magnetic metals through the decomposition of the respective metal carbonyls in a toluene solution of rubbery polymers is disclosed in U.S. Pat. No. 3,228,881. Such a type of process is described by Hess et al., *Applied Polymer Science*, Vol. 10, page 1915 (1966). Unfortunately, the use of such a type of process includes limitations which include, for example, the fact that highly diluted solvent base systems are employed; the processes related to magnetic metals only; and the dimensions and shapes of the formed metal particles are difficult to predict and control.

The preparation of a catalyst composition comprising colloidal rhodium encapsulated in polyvinylalcohol is disclosed in *J. Macromol. Sci.—Chem.*, Vol. A (12) page 1117 (1978). Unfortunately, the disclosed compositions are useful in a limited number of applications.

In view of the deficiencies of the prior art, it would be highly desirable to provide a process for providing preformed, powdered, submicron size metal (both magnetic and nonmagnetic) particles dispersed in a substantially non-agglomerated manner in hydrophobic polymers.

SUMMARY OF THE INVENTION

In one aspect, the present invention is an aqueous colloidal dispersion comprising a continuous aqueous phase and a polymer/inorganic solid disperse phase wherein a substantial portion of the particles of the disperse phase comprise a hydrophobic polymer matrix having dispersed therein essentially non-oxidized colloidal metal particles such that substantially all of the inorganic particles are maintained in a discrete spaced apart relationship to one another by the hydrophobic polymer. Surprisingly, dispersion of the inorganic solid particles into the polymer matrix is achieved by a process having an emulsion polymerization step without the necessity of pretreating the particles with polymer, acid or other conventional anchoring agent prior to the emulsion polymerization step. Also, in the colloidal size polymer matrix having the inorganic solid dispersed therein, the inorganic solid particles remain in a discrete, essentially nonagglomerated form. Hereinafter, this colloidal-size matrix is called "matrix particulate" or "matrix particles". Thus, the discrete inorganic solid particles of essentially non-oxidized colloidal metal particles are entirely coated with polymer. Moreover, in many particles of the particulate (colloidal-size polymer matrix), two or more inorganic particles reside in a spaced apart relationship. The dispersions of inorganic particles in polymer matrix can be further characterized in that when the inorganic particle is magnetic, the dispersion remains stable in the applied magnetic field. The aqueous colloidal dispersions of this invention can behave as ferromagnetic aqueous fluids which are stable in magnetic fields when the inorganic particles are magnetic. The inorganic particles also can be nonmagnetic.

In another aspect, the present invention is a particulate having colloidal size particles wherein substantially all of said particles comprise a hydrophobic polymer matrix and at least one discrete colloidal particle of an inorganic solid dispersion in said matrix, wherein said inorganic solid is in the form of essentially non-oxidized colloidal metal particles.

The matrix particulates of this invention are particularly useful in applications requiring a colloidal size particulate which can have magnetic properties. Examples of such applications include (1) the separation of a water-miscible fluid from a water-immiscible fluid as described in U.S. Pat. No. 4,108,767; (2) clarification processes as described in U.S. Pat. Nos. 4,089,779 and 4,110,208; and (3) the absorption of ELM (e.g., microwave or radio) radiation. Such matrix particulates are also useful in magnetic paints, electrically resistive barriers as in EMI shielding, moldable magnetic powders, as toners in electrophotographic applications, electroconductive additives for plastics, pressure sensors, pigments in paint and ink formulations, aqueous base magnetic coatings, and metallic core latexes. Particular uses depend upon whether the metal particulates are magnetic or non-magnetic in character. Such particulates are suitably employed as chromatographic support materials and as diagnostic materials in human and animal health applications such as described in *Nature*, Vol. 270, pp. 259–261 (17 Nov. 1977); *Science*, Vol. 200, pp. 1074–1076 (June 2, 1978) and U.S. Pat. No. 4,157,323; and as catalysts such as described in U.S. Pat. No. 4,157,323.

DETAILED DESCRIPTION OF ILLUSTRATIVE EMBODIMENTS

Inorganic solids suitably employed in the practice of this invention are inorganic materials in the form of colloidal particles, (i.e., particles preferably have average diameters generally less than about 0.9 micrometer, more preferably from 0.005 to about 0.6 micrometer, most preferably from about 0.005 to about 0.3 micrometer, which particles tend to form aggregates if dispersed in a hydrophobic polymer using conventional blending techniques. When dispersed in water, these inorganic particulates tend to aggregate or agglomerate upon standing. Often, as a result of such agglomeration, the inorganic particles settle to the lower region of the aqueous dispersion. These solids are insoluble in water and hydrocarbon and are incapable of adsorbing more than 5 weight percent of hydrocarbon based on the weight of the solid. Examples of such inorganic solids which are of particular interest are powders of metals (magnetic and non-magnetic) and metal alloys, and include aluminum, cobalt, iron, copper, nickel, chromium, zinc, palladium, silver, ruthenium, platinum, gold, rhodium, lead and alloys of these metals such as alloys of iron with metals such as cobalt, nickel, brass and stainless steel. Preformed colloidal particles can be employed in a wide variety of dimensions, shapes and crystallographic structures. For example, colloidal particles can have cubic, hexagonal or elongated structures.

Typically, aqueous dispersions of metal particles are prepared by methods normally employed in comminuting metals and their ores (e.g., grinding and electrolysis or by precipitation methods). In both instances, chemical dispersants and/or surfactants as described hereinafter are used to maintain the aqueous dispersions in a reasonably stable state. Similar aqueous colloidal dispersions of nonmagnetic, inorganic solids are prepared by conventional techniques used in the manufacture of colloidal gold, and the like. Examples of such methods are described by A. King in *Inorganic Preparations,* Van Nostrand (1936); H. H. Holmes in *Manual of Colloid Chemistry,* MacMillan (1922); R. R. Myers et al. in *Pigments,* Marcel-Dekker (1975) and *Angew, Chem.,* International Ed., Vol. 19, 190–196 (1980).

The hydrophobic monomers employed in the practice of this invention are essentially water-immiscible (i.e., the monomer forms a separate phase when 5 g of monomer is mixed with 100 g of water). Such water-immiscible monomer(s) will polymerize under emulsion polymerization conditions to form a water-insoluble polymer which will exist in the form of a stable aqueous colloidal dispersion, usually with the aid of suitable surface active agents. Examples of suitable hydrophobic monomers include monovinylidene aromatic monomers such as styrene, vinyl toluene, t-butyl styrene, chlorostyrene, vinylbenzyl chloride and vinyl pyridene; alkyl esters of α,β-ethylenically unsaturated acids such as ethyl acrylate, methyl methacrylate, butyl acrylate and 2-ethylhexyl acrylate; unsaturated esters of saturated carboxylic acids such an vinyl acetate, unsaturated halides such as vinyl chloride and vinylidene chloride; unsaturated nitriles such as acrylonitrile; dienes such as butadiene and isoprene; and the like. Of these monomers, the monovinylidene aromatics such as styrene and the alkyl acrylates such as butyl acrylate are preferred. In addition to the aforementioned hydrophobic monomer, relatively minor portions (e.g., less than 10, preferably less than 5, weight percent based on total monomer component, of a water-soluble monomer such as an ethylenically unsaturated carboxylic acid or its salt such as acrylic acid or sodium acrylate; methacrylic acid, itaconic acid and maleic acid; an ethylenically unsaturated carboxamide such as acrylamide; vinyl pyrrolidone; hydroxyalkyl acrylates and methacrylates such as hydroxyethyl acrylate, hydroxypropyl acrylate and hydroxyethyl methacrylate; aminoalkyl esters of unsaturated acids such as 2-aminoethyl methacrylate; epoxy functional monomers such as glycidyl methacrylate; sulfoalkyl esters of unsaturated acids such as 2-sulfoethyl methacrylate; ethylenically unsaturated quaternary ammonium compounds such as vinylbenzyl trimethyl ammonium chloride may be employed. It is critical, however, that such water-soluble monomers not be employed in amounts sufficient to render the resulting polymer soluble in water. Particularly effective monomer recipes for the practice of this invention are those containing from about 20 to about 90 weight percent of styrene, from about 10 to about 80 weight percent of alkyl acrylate such as butyl acrylate and from about 0.01 to about 2 weight percent of the unsaturated carboxylic acids such as acrylic acid, with said weight percentages being based on the weight of total monomers.

In the practice of this invention, it is preferred to initially prepare an aqueous colloidal dispersion of the inorganic solid by contacting said solid with an aqueous solution of a water-soluble surfactant or emulsifier thereby forming the dispersion which contains from about 5 to about 70 weight percent of the inorganic solid. Typically, suitable surface active agents or emulsifiers include salts of fatty acids such as potassium oleate, metal alkyl sulfates such as sodium lauryl sulfate, salts of alkyl aryl sulfonic acids such as sodium dodecylbenzene sulfonate, polysoaps such as sodium polyacrylate and alkali metal salts of methyl methacrylate/2-sulfoethyl methacrylate copolymers and other sulfoalkyl acrylate copolymers, styrene maleic anhydride polymers, and other anionic surfactants such as the dihexyl ester of sodium sulfosuccinic acid; nonionic surfactants such as the nonionic condensates of ethylene oxide with propylene oxide, ethylene glycol and/or propylene glycol; and cationic surfactants such as alkylamine-quanidine polyoxyethanols, as well as a wide variety of micelle generating substances described by D. C. Blackley in *Emulsion Polymerization,* Wiley and Sons, Chapter 7 (1975) and other surfactants listed in McCutcheon's *Detergents and Emulsifiers,* 1980 Annual, North American Edition, McCutcheon, Inc., Morristown, N.J. Also included among the suitable surfactants are the surface active polymers (often called polysoaps), e.g., those described in U.S. Pat. No. 3,965,032. Of the suitable surfactants, the anionic varieties such as the potassium salts of functionalized oligomers (e.g., Polywet varieties sold by Uniroyal Chemical) are preferred. Such surface active agents or emulsifiers are employed in amounts sufficient to provide a stable dispersion of the inorganic solid in water. Preferably, such surface active agents are employed in concentrations in the range from about 0.2 to about 10, most preferably from about 1 to about 6, weight percent based on the aqueous phase. Particularly desirable processes for forming such solids are described in U.S. Pat. Nos. 3,826,667; 3,981,844; 3,843,540 and *Industrial Engineering Production and Research Development,* Vol. 19, 147–151 (1980).

The aqueous dispersion of inorganic (i.e., metallic) solid is then combined with the water-immiscible monomer to form the desired emulsion by normal mixing procedures, for example, passing both the dispersion and monomer through a high shear mixing device such as a Waring blendor, homogenizer or ultrasonic mixer. Alternatively, the monomer is added continuously to the aqueous dispersion of inorganic solid during the polymerization. Advantageously, the monomer is in the form of an aqueous emulsion of the monomer which emulsion is maintained by a water-soluble monomer and/or water-soluble emulsifier such as described hereinbefore. As another alternative, the aqueous emulsion of inorganic solid and water-immiscible monomer can be prepared by adding colloidal size inorganic particles to an existing aqueous emulsion of monomer. In such instances, it is often desirable to add additional emulsifier to the emulsion prior to or simultaneous with the addition of the inorganic solid. In the emulsion of inorganic solid and water-immiscible monomer, the aqueous phase is present in a proportion sufficient to be the continuous phase of the emulsion. The inorganic solid is present in proportions sufficient to provide the matrix particulate, with the desired characteristics, (e.g., magnetic properties, etc.). The water-immiscible monomer is present in proportion sufficient to enclose or encapsulate the inorganic solid when polymerized, and sufficient emulsifier and/or surface active agent is present to provide an aqueous colloidal emulsion which is sufficiently stable to be subjected to emulsion polymerization conditions. Preferably, the emulsion contains from about 0.1 to about 25 weight percent of inorganic solid, from about 1 to about 30 weight percent of monomer and a remaining amount of the aqueous phase including emulsifier (surfactant), catalyst and the like.

The emulsion polymerization conditions employed in the practice of this invention are generally conventional free-radical type polymerizations carried out in the presence of a radical initiator such as a peroxygen compound, an azo catalyst, ultraviolet light and the like. Preferably, such polymerization is carried out in the presence of a water-soluble peroxygen compound at temperatures in the range from about 50° to about 90° C. The emulsion is generally agitated during the polymerization period in order to maintain adequate feed transfer. The concentration is normally in the range from about 0.005 to about 8, preferably from about 0.01 to about 5, weight percent based on total monomer. Examples of suitable catalysts include inorganic persulfate compounds such as sodium persulfate, potassium persulfate, ammonium persulfate; peroxides such as hydrogen peroxide, t-butyl hydroperoxide, dibenzoyl peroxide and dilauroyl peroxide; azo catalysts such as azobisisobutyronitrile, and other common free-radical generating compounds. Also suitable are various forms of free-radical generating radiation means such as ultraviolet radiation, electron beam radiation and gamma radiation. Alternatively, a redox catalyst composition can be employed wherein the polymerization temperature ranges from about 25° to about 80° C. Exemplary redox catalyst compositions include a peroxygen compound as described hereinbefore, preferably potassium persulfate or t-butyl hydroperoxide and a reducing component such as sodium metabisulfite and sodium formaldehyde hydrosulfite. It is also suitable to employ various chain transfer agents such as mercaptans (e.g., dodecyl mercaptan; dialkyl xanthogen disulfides; diaryl disulfides and others listed in Blackley, supra, Chapter 8 in concentrations as described therein.

Following emulsion polymerization, the emulsion polymerizate can be withdrawn from the polymerization vessel and (1) the emulsion is employed as is or (2) the unreacted monomer and other volatiles are removed to form a concentrated emulsion and then used or (3) the matrix particulate can be separated from the aqueous continuous phase of the dispersion by conventional means such as drying under vacuum, spray drying or freeze drying. The dried matrix particulate preferably contains from about 1 to about 70, more preferably from about 5 to about 50, weight percent of inorganic solid and from about 99 to about 30, more preferably from about 95 to about 50, weight percent of polymer matrix. The resulting powders can be fabricated by extrusion, molding, or other fabrication techniques.

The following examples are given to illustrate the invention and should not be construed as limiting its scope. Unless otherwise indicated, all parts and percentages are by weight.

EXAMPLE I

Into 37.2 grams (g) deionized water containing 2 g of a 1N sodium hydroxide solution and 7.4 g of an aqueous solution of a potassium salt of a functionalized oligomer sold by Uniroyal Chemical under the tradename "Polywet KX-4" (3 g active emulsifier) and under nitrogen sparge is dispersed 2 g of colloidal size iron particles using an ultrasonic probe operating at 90 percent capacity for 4 minutes. To the dispersion is charged 11.5 g of a monomer mixture containing 5 g styrene(s), and 5 g butylacrylate (BA). The mixture is subjected to contact with the ultrasonic probe operating at 90 percent capacity for another 5 minutes. To the mixture is added 1.5 g tertiary butylhydroperoxide (TBHP) and the mixture is transferred to a 250 ml reaction flask and gradually heated with agitation under nitrogen atmosphere to 90° C. To the mixture is added an aqueous stream at a rate of about 2 ml/min. over about a 30 minute period. The aqueous stream contains 50 g deionized water, 7.4 g of the aforementioned Polywet KX-4 (3 g active emulsifier), 2 g of a 1N sodium hydroxide solution and 0.5 g sodium persulfate (Formapon). The reaction mixture is maintained under nitrogen and with agitation for 90 minutes, after the aqueous stream addition is completed.

The resulting product contains 12 percent solids latex which is concentrated by distillation under vacuum to 26 percent solids. The latex particles have an average diameter of 6300 Å and the dried sample contains 12.6 percent iron. The sample is designated as Sample No. 1. Data concerning the process and composition of Sample No. 1 as well as other samples similarly prepared using the general process are presented in Table I.

TABLE I

| Sample | Dispersed Metal | | | $H_2O$ (g) | Monomer | | Initiator | | Percent Metal in Dry Latex |
| | Type of Metal | Amount of metal (g) | Active Emulsifier (g) | | S (g) | BA (g) | TBHP (g) | $Na_2S_2O_8$ (g) | |
| --- | --- | --- | --- | --- | --- | --- | --- | --- | --- |
| 1 | Fe[1] | 2 | 3 | 37.2 | 5 | 5 | 1.5 | 0.5 | 12.6 |

TABLE I-continued

| | Dispersed Metal | | | | | | Initiator | | Percent |
| | Type | Amount of metal | Active Emulsifier | $H_2O$ | Monomer | | TBHP | $Na_2S_2O_8$ | Metal in |
| Sample | of Metal | (g) | (g) | (g) | S (g) | BA (g) | (g) | (g) | Dry Latex |
|---|---|---|---|---|---|---|---|---|---|
| 2 | $Fe^1$ | 21 | 21 | 442 | 35 | 35 | 36 | 14 | 20.4 |
| 3 | $Fe^1$ | 40 | 40 | 950 | 66.7 | 66.7 | 66 | 26.7 | 17.9 |
| 4 | $Fe^1$ | 40 | 40 | 990 | 66.7 | 66.7 | 26.7 | 26.6 | 18.2 |
| 5 | $Fe^2$ | 3 | 3 | 42 | 5 | 5 | 1 | 2 | NA |
| 6 | $Fe^2$ | 40 | 40 | 990 | 66.7 | 66.7 | 26.7 | 26.6 | 26.4 |
| 7 | $Ag^3$ | 0.76 | 0.6 | 20 | 6.0 | 1.5 | 0.18 | — | NA |
| 8 | $Cu^4$ | 7.5 | 4.5 | 56.5 | 3.75 | 3.75 | 1.5 | 0.75 | 46.0 |
| 9 | $Cu^4$ | 5.0 | 3.0 | 54.0 | 5.0 | 5.0 | 2.0 | 1.0 | 30 |

[1] Iron powder has an average particle size of about 300 Å and is commercially available from Vacuum Metallurgical Company, Tokyo, Japan.
[2] Iron particles have an elongated shape and average dimension of 0.5 μm by 1 μm and is commercially available from Pfizer Chemical.
[3] Silver powder has an average particle size from 150 to 200 Å.
[4] Copper powder has an average particle size of about 500 Å and is commercially available from Vacuum Metallurgical Company, Tokyo, Japan.
NA indicates not measured.

The data in Table I indicate that stable colloidal dispersions of various metals in a hydrophobic polymer can be prepared.

What is claimed is:

1. An aqueous colloidal dispersion comprising a continuous aqueous phase and a polymer/inorganic solid disperse phase wherein a substantial portion of the particles of the disperse phase comprise a hydrophobic polymer matrix having dispersed therein essentially non-oxidized colloidal metal particles such that substantially all of the inorganic particles are maintained in a discrete spaced apart relationship to one another by the hydrophobic polymer.

2. The dispersion of claim 1 wherein said inorganic solid is an essentially non-oxidized magnetic metal.

3. The dispersion of claim 1 wherein the essentially non-oxidized metal is aluminum, cobalt, iron, copper, nickel, chromium, zinc, palladium, silver, ruthenium, platinum, gold, rhodium, lead, and alloys thereof.

4. The dispersion of claim 1 wherein the polymer is a polymer of a monovinylidene aromatic monomer, an alkyl ester of an unsaturated carboxylic acid, or a mixture thereof.

5. The dispersion of claim 1 wherein the polymer is a copolymer of styrene and butyl acrylate.

6. The dispersion of claim 1 wherein the metal particles have an average diameter less than about 0.9 micrometer.

7. The dispersion of claim 1 wherein the metal particles have an average diameter in the range from about 0.005 to about 0.6 micrometer.

8. A particulate having colloidal size particles wherein substantially all of said particles comprise a hydrophobic polymer matrix and at least one discrete colloidal particle of an inorganic solid dispersed in said matrix, wherein said inorganic solid is in the form of essentially non-oxidized colloidal metal particles.

9. The particulate of claim 8 wherein the essentially non-oxidized metal is aluminum, cobalt, iron, copper, nickel, chromium, zinc, palladium, silver, ruthenium, platinum, gold, rhodium, lead, and alloys thereof.

10. The particulate of claim 8 wherein the polymer is a polymer of a monovinylidene aromatic monomer, an alkyl ester of an unsaturated carboxylic acid, or a mixture thereof.

11. The particulate of claim 8 wherein the metal particles have an average diameter less than about 0.9 micrometer.

12. The particulate of claim 8 wherein the metal particles have an average diameter in the range from about 0.005 to about 0.6 micrometer.

13. The particulate of claim 8 which contains from about 1 to about 70 weight percent inorganic solid and from about 30 to about 99 weight percent of said matrix polymer.

* * * * *